(12) United States Patent
Geary

(10) Patent No.: US 12,542,821 B2
(45) Date of Patent: Feb. 3, 2026

(54) CALL QUALITY ANALYSIS, NOTIFICATION AND IMPROVEMENT

(71) Applicant: Avaya Management L.P., Durham, NC (US)

(72) Inventor: Dara Geary, Galway (IE)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 18/598,946

(22) Filed: Mar. 7, 2024

(65) Prior Publication Data

US 2024/0305683 A1    Sep. 12, 2024

Related U.S. Application Data

(60) Provisional application No. 63/450,559, filed on Mar. 7, 2023.

(51) Int. Cl.
*H04L 65/80* (2022.01)

(52) U.S. Cl.
CPC .................................... *H04L 65/80* (2013.01)

(58) Field of Classification Search
CPC .... H04L 65/80; H04L 65/1089; H04L 65/403
See application file for complete search history.

(56) References Cited

U.S. PATENT DOCUMENTS

| | | | |
|---|---|---|---|
| 6,839,416 B1 | 1/2005 | Shaffer | |
| 8,284,675 B2 * | 10/2012 | Ansari | H04M 3/2227 370/254 |
| 8,311,196 B2 | 11/2012 | Hanson et al. | |
| 8,587,630 B1 * | 11/2013 | Krinsky | H04N 17/00 348/14.02 |
| 9,119,098 B2 * | 8/2015 | Krinsky | H04W 24/00 |
| 9,641,681 B2 * | 5/2017 | Nuta | G10L 15/063 |
| 10,142,476 B1 * | 11/2018 | Chen | H04M 3/5183 |
| 2003/0185371 A1 | 10/2003 | Dobler | |
| 2008/0037443 A1 * | 2/2008 | Ansari | H04L 65/80 370/254 |
| 2013/0058238 A1 * | 3/2013 | Ansari | H04M 3/2227 370/252 |
| 2015/0215184 A1 * | 7/2015 | Sundararajan | H04L 43/00 370/252 |
| 2015/0356859 A1 * | 12/2015 | Hwang | G08B 25/08 455/404.1 |
| 2021/0099579 A1 * | 4/2021 | Vuppaladhadiam | H04M 7/1275 |
| 2023/0247077 A1 * | 8/2023 | Yu | H04L 65/403 348/14.03 |
| 2024/0112686 A1 * | 4/2024 | Cutler | H04N 7/147 |
| 2024/0114205 A1 * | 4/2024 | White | H04M 3/568 |
| 2024/0267422 A1 * | 8/2024 | Resman | H04L 65/1069 |

* cited by examiner

*Primary Examiner* — Oanh Duong
(74) *Attorney, Agent, or Firm* — Sheridan Ross P.C.

(57) ABSTRACT

Communication between remote participants is often impeded by quality issues of the audio and/or video components. Systems and methods are provided that determine whether a deficient audio or video quality is present and, if so, select and implement an improvement action. When a particular deficiency is present that cannot be improved, user endpoints may be notified. As a benefit, users may avoid wasting time attempting to resolve an unresolvable issue. Determination of a quality improvement action may comprise training and utilizing a neural network to determine an action to address a particular deficiency.

20 Claims, 5 Drawing Sheets

CALL QUALITY ANALYSIS, NOTIFICATION AND IMPROVEMENT

CROSS-REFERENCE TO RELATED APPLICATIONS

The present application claims the benefit of Provisional Patent Application No. 63/450,559 filed on Mar. 7, 2023, and is incorporated herein by reference in its entirety.

FIELD OF THE DISCLOSURE

The invention relates generally to systems and methods related to audio or video quality in conferencing applications and particularly to providing feedback to communicants of audio and/or video quality.

BACKGROUND

Multiple factors can impact the audio and/or video quality of a multi-party conference, such as the equipment utilized, user location, network characteristics, and so on. Most modern conferencing applications, such as Microsoft Teams, have audio/video (AV) quality monitors that can display various factors influencing call quality. For example, systems may perform a slow network "ping" (see www.learn.microsoft.com/en-us/microsoftteams/use-call-analytics-to-troubleshoot-poor-call-quality). Applications such as Zendesk can also detect local problems like microphone issues and the presence of jitter (see www.support.zendesk.com/hc/en-us/articles/4408833546522-Reporting-on-Talk-network-and-audio-quality).

Conferencing applications may provide call quality dashboards that can be used to historically show quality trends over time (see www.learn.microsoft.com/en-us/microsoft-teams/cqd-what-is-call-quality-dashboard).

Other systems, like Spearline, make periodic test calls (see www.spearline.com/blog/the-beginners-guide-to-voice-quality-testing/) and analyze the data using techniques like Perceptual Evaluation of Speech Quality (PESQ) (see www.wikipedia.org/wiki/Perceptual_Evaluation_of_Speech_Quality).

SUMMARY

The prior art systems are limited to historic or, at best, near real-time reporting that focus on raw data and not what users will actually hear. Prior art systems do not gauge how the speaker's audio will sound to other users, draw conclusions from the various factors live on the call, and make corresponding recommendations (e.g., "your voice is sounding scratchy," "your microphone may be faulty"). Prior art systems do not display the relevant limiting factors for a given user to the other parties on the call (e.g., "Mary's voice is going to suffer approx. 2 seconds lag every time she speaks because of her slow network").

These and other needs are addressed by the various embodiments and configurations of the present invention. The present invention can provide a number of advantages depending on the particular configuration. These and other advantages will be apparent from the disclosure of the invention(s) contained herein.

In one embodiment, communication systems and methods are disclosed comprising a "virtual attendee" that can monitor one or more facets and/or factors influencing how a given speaker's voice actually sounds from the viewpoint of other conference users. If/when his/her audio (and/or video) feed is of poor quality, the virtual attendee can inform i) the speaker themselves and/or ii) the other users. It will also evaluate the "best possible" audio achievable per user based on the equipment being used, the location in the world of each party, the surrounding room, and so on.

In an embodiment: the system could take automatic corrective action in certain well-understood circumstances. For example, if one user's audio feed generates disruptive noise (e.g., beeping, hissing, or feedback) into the conference, audible to other users, the system could automatically mute that person and inform him/her that there is a noise problem, allowing them to correct it.

In an embodiment: the system could use client-side user interface techniques to display "live" audio quality to users. For example, on a mobile device, there could be a "power bar" (similar to that shown for mobile coverage) showing the user's perceived speech quality, i.e., how the user sounds to other users.

The present disclosure can provide a number of advantages, depending on the particular configuration.

The system can provide quality feedback in real time. It can focus on not only raw data but also what users will actually hear. It can gauge how the speaker's audio will sound for other users, draw conclusions from the various factors live on the call, and make recommendations (e.g., "your voice is sounding scratchy," or "your microphone may be faulty"). It can display the limiting factors for a given user to the other parties on the call (e.g., "Mary's voice is going to suffer approximately 2 seconds' lag every time she speaks because of her slow network").

In some aspects, the techniques described herein relate to a conferencing component, including: the conferencing component including a processor coupled to a computer-readable medium including processor executable instructions that, when executed, cause the processor to: monitor a communication between a plurality of endpoints via a network, the communication including at least one of encoded audio or encoded video originating from at least one endpoint of the plurality of endpoints; determine, from the monitored communication, one or more metrics indicating a signal quality of at least one of the encoded audio or the encoded video; when the one or more metrics indicates a deficient signal quality, further determine whether the one or more metrics is associated with an unresolvable signal quality; upon determining that the one or more metrics is associated with the unresolvable signal quality, signal at least one of the plurality of endpoints to perform an accommodation action; and upon determining that the one or more metrics is not associated with the unresolvable signal quality, initiate a quality improvement action.

In some aspects, the techniques described herein relate to a conferencing component, wherein the quality improvement action includes automatically muting at least one endpoint of the plurality of endpoints.

In some aspects, the techniques described herein relate to a conferencing component, wherein the quality improvement action includes activating an alerting function of one endpoint of the plurality of endpoints originating from the at least one of the encoded audio or the encoded video.

In some aspects, the techniques described herein relate to a conferencing component, wherein the instructions further cause the processor to: upon determining that the one or more metrics indicates the deficient signal, when the one or more metrics indicate a cause of the deficient signal includes a first connection to the network utilized by one endpoint of the plurality of endpoints, search for a second connection to the network; and upon locating the second connection, reconfiguring the one endpoint of the plurality of endpoints to utilize the second connection to the network and terminate use of the first connection to the network.

In some aspects, the techniques described herein relate to a conferencing component, wherein the instructions to cause the processor to signal at least one of the plurality of endpoints to perform the accommodation action further include instructions to cause the processor to signal at least one of the plurality of endpoints to perform to present an indicum of the deficient signal quality.

In some aspects, the techniques described herein relate to a conferencing component, wherein the instructions to cause the processor to signal the at least one of the plurality of endpoints to perform the accommodation action further include instructions to cause the processor to signal the at least one of the plurality of endpoints to automatically mute an audio input providing the encoded audio.

In some aspects, the techniques described herein relate to a conferencing component, further including: instructions to cause the processor to determine a muting duration associated with a time that additional audio signals will not further degrade the signal quality of at least one of the encoded audio or the encoded video; when the encoded audio includes audio originating from one endpoint of the plurality of endpoints, automatically muting a second endpoint of the plurality of endpoints; and when the encoded audio is void of the audio originating from the one endpoint of the plurality of endpoints for the muting duration, automatically unmuting the second endpoint of the plurality of endpoints.

In some aspects, the techniques described herein relate to a conferencing component, wherein the instructions cause the processor to signal the at least one of the plurality of endpoints to perform the accommodation action further include instructions to cause the processor to signal the at least one of the plurality of endpoints to activate a notification feature indicating.

In some aspects, the techniques described herein relate to a conferencing component, further including instructions to cause the processor to determine that at least one of the conferencing component or a component of the network is associated with an attribute that corresponds to the one or more metrics that indicates the deficient signal quality.

In some aspects, the techniques described herein relate to a conferencing component, wherein the instructions to cause the processor to determine the one or more metrics indicating the signal quality further include instructions to cause the processor to provide the monitored communication to a neural network trained to receive the monitored communication and, therefrom, determine the quality improvement action.

In some aspects, the techniques described herein relate to a conferencing component, wherein the training the neural network to determine the quality improvement action includes: collecting a set of prior communication from a database, the prior communications including deficient quality communications and non-deficient quality communications; applying one or more quality improvement action transformations to each prior communication including simulating an impaired microphone, simulating an improved microphone, simulating an impaired camera, simulating an improved camera, simulating an impaired processor of an endpoint, simulating an improved processor of an endpoint, simulating an impaired network component, simulating an improved network component, simulating an impaired processor of a server, simulating an improved processor of a server to create a modified set of prior communications; creating a first training set including the collected set of prior communications, the modified set of prior communications, and a set of non-improved prior communications; training the neural network in a first stage using the first training set; creating a second training set for a second stage of training including the first training set and the set of prior non-improved prior communications incorrectly determined as improved after the first stage of training; and training the neural network in the second stage using the second training set.

In some aspects, the techniques described herein relate to a conferencing component, wherein the conferencing component includes one endpoint of the plurality of endpoints.

In some aspects, the techniques described herein relate to a conferencing component, wherein the conferencing component includes a server hosting the communication.

In some aspects, the techniques described herein relate to a method for improving quality of a communication, including: monitoring the communication between a plurality of endpoints via a network, the communication including at least one of encoded audio or encoded video originating from at least one endpoint of the plurality of endpoints; determining, from the monitored communication, one or more metrics indicating a signal quality of at least one of the encoded audio or the encoded video; when the one or more metrics indicates a deficient signal quality, further determine whether the one or more metrics is associated with an unresolvable signal quality; upon determining that the one or more metrics is associated with the unresolvable signal quality, signaling at least one of the plurality of endpoints to perform an accommodation action; and upon determining that the one or more metrics is not associated with the unresolvable signal quality, initiate a quality improvement action.

In some aspects, the techniques described herein relate to a method, wherein the quality improvement action includes automatically muting at least one endpoint of the plurality of endpoints.

In some aspects, the techniques described herein relate to a method, wherein the quality improvement action includes activating an alerting function of one endpoint of the plurality of endpoints originating from the at least one of the encoded audio or the encoded video.

In some aspects, the techniques described herein relate to a method, wherein: upon determining that the one or more metrics indicates the deficient signal, when the one or more metrics indicate a cause of the deficient signal includes a first connection to the network utilized by one endpoint of the plurality of endpoints, searching for a second connection to the network; and upon locating the second connection, reconfiguring the one endpoint of the plurality of endpoints to utilize the second connection to the network and terminate use of the first connection to the network.

In some aspects, the techniques described herein relate to a method, wherein signaling the at least one of the plurality of endpoints to perform the accommodation action further includes signaling the at least one of the plurality of endpoints to present an indicum of the deficient signal quality.

In some aspects, the techniques described herein relate to a method, wherein signaling the at least one of the plurality of endpoints to perform the accommodation action further includes signaling the at least one of the plurality of endpoints to automatically mute an audio input providing the encoded audio.

In some aspects, the techniques described herein relate to a computer-readable medium coupled to a processor, the medium including one or more computer-readable instructions, the processor executing the one or more computer-readable instructions to: monitor a communication between a plurality of endpoints via a network, the communication including at least one of encoded audio or encoded video originating from at least one endpoint of the plurality of endpoints; determine, from the monitored communication, one or more metrics indicating a signal quality of at least one of the encoded audio or the encoded video; when the one or more metrics indicates a deficient signal quality, further determine whether the one or more metrics is associated with an unresolvable signal quality; upon determining that the one or more metrics is associated with the unresolvable signal quality, signal at least one of the plurality of endpoints to perform an accommodation action; and upon determining that the one or more metrics is not associated with the unresolvable signal quality, initiate a quality improvement action.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
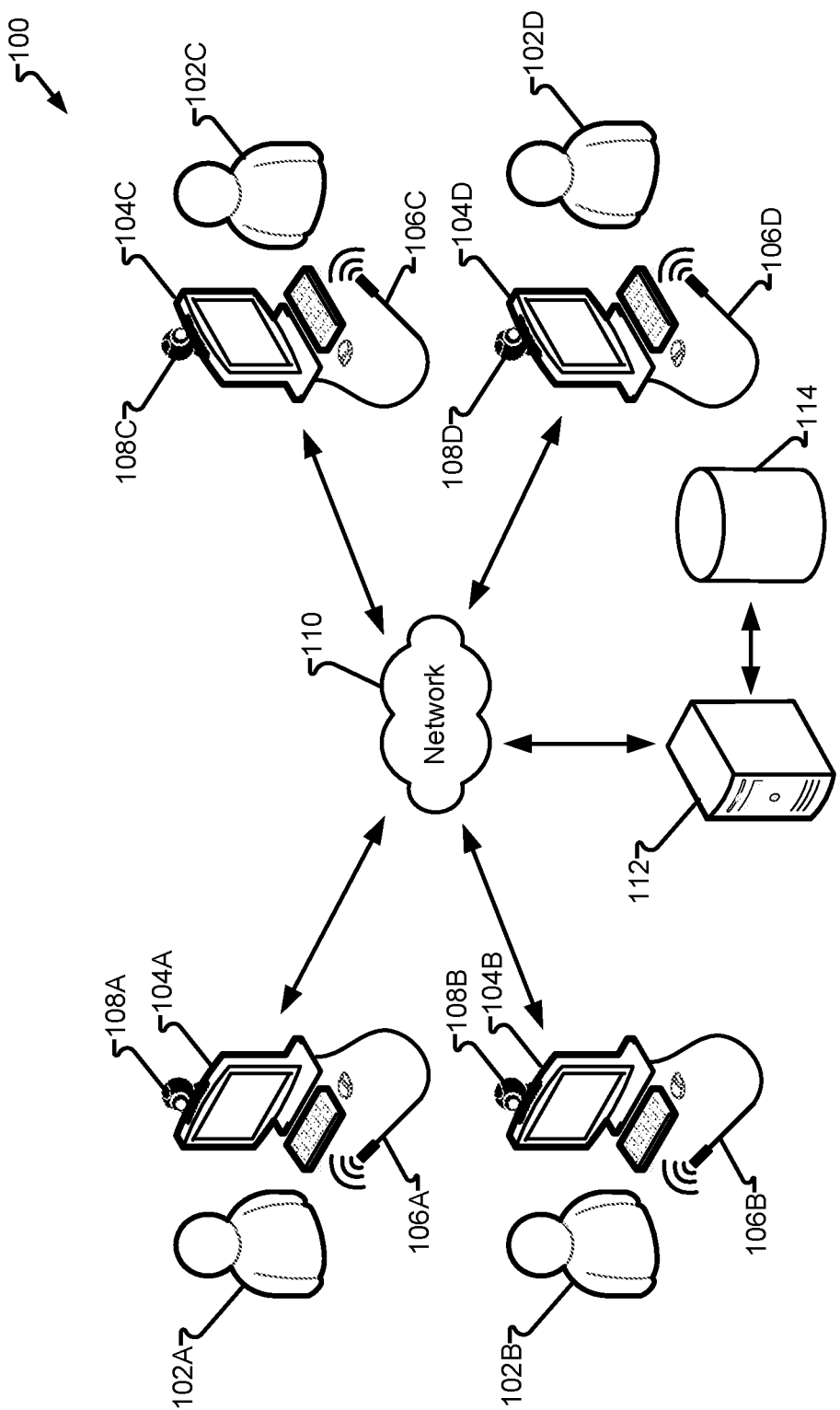
FIG. 1 depicts a system in accordance with embodiments of the present disclosure.

FIG. 1 depicts system 100 in accordance with embodiments of the present disclosure. In one embodiment, users 102A-D are engaged in a conference utilizing their respective user endpoints 104A-D to exchange encoded media, and optionally other content, via network 110. In another embodiment, server 112 provides conferencing services which may include, but are not limited to, adding/removing attendees, encoding and broadcasting conference content, receiving conference content from any of one or more of user endpoints 104A-D, which may comprise at least a portion of the conference content, recording, transcription, and other services, such as those described in the embodiments that follow.

While four users 102 are illustrated, wherein each utilizes their respective user endpoint 104, it should be appreciated that the number of users and their respective devices may be greater or fewer than those illustrated. Certain embodiments disclosed herein may be applicable to as few as two users 102, and their respective user endpoints, and other certain embodiments may not have a limit to the number of users 102 and their respective endpoints 104.

Each user endpoint 104 is illustrated as a personal computer having a network interface to network 110 and configured to receive a conference broadcast by server 112. However, it should be appreciated that other device types may be utilized without departing from the scope of the embodiments disclosed herein. For example, a user may utilize an audio-only telephone and receive only an audio portion of the conference broadcast by server 112. Additionally, such an audio-only device may provide audio-only inputs to server 112. In other embodiments, one or more user endpoints 104 may be embodied as smart phones, digital telephones, computers having telephony features (e.g., a "soft phone"), or other devices having at least a network interface to receive conference content received from server 112 via network 110 for presentation of the conference content, or a portion thereof, and optionally receiving the output of a sensing device (e.g., cameras 108A-108D, microphone 106, keyboard of user endpoint 104, etc.), which may be provided to server 112 and incorporated into the conference content.

User endpoint 104 comprises at least one input component or peripheral device (e.g., keyboard, touchpad, touchscreen, mouse, keyboard, trackballs, etc.) and/or assistance features to aid those users 102 having a speech, vision, or hearing impairment. Assistance features may include, but are not limited to, Braille keyboard and/or tactile output, speech-based command entry, text-to-speech, speech-to-text, etc. User endpoint 104 comprises at least one output component (e.g., video display, speaker, etc.). Conference content provided to a particular user endpoint 104 may be customized by server 112 to suit that particular user endpoint 104. For example, encoding the conference content to be broadcast to the particular user endpoint 104 to utilize the available bandwidth and/or including only the types of communication for which the particular user endpoint 104 is able to utilize (e.g., omitting video when the particular user endpoint 104 is an audio only device, omitting audio or converting audio to text when the particular user endpoint 104 is not configured with speakers, etc.).

As introduced above, server 112 may provide conferencing services for a remote conference or, more simply and as used herein, "conference." However, the use of "conference" shall not be interpreted to include embodiments that exclusively utilize in-person communications. Conferencing services may include floor control, managing bandwidth requirements for each user endpoint 104, receiving the outputs from one or more user endpoints 104 to be incorporated into the conference content and broadcast to the other users 102, recording, transcription, screen sharing, document sharing, and/or other features. Server 112 may utilize data storage 114 as a repository for conference content (e.g., recordings, shared documents, logs, etc.), configurations (e.g., which user endpoints 104 are able to receive particular types of communication, bandwidth limitations of user endpoint 104, etc.). It should also be appreciated that the topology of system 100 is one topology and, in another topology, the features and functions of server 112 and data storage 114 may be co-embodied with one or more user endpoints 104. In other topologies, the various components (e.g., each user endpoint 104, server 112, data storage 114) may be configured in a different network configuration, such as when data storage 114 is embodied as a discrete storage device(s) having its own network interface to network 110.

The quality of the conference is affected by many factors. Audio, in particular the speech provided by one or more users 102, converted into electrical signals by their respective microphone 106, and encoded as encoded audio signals by their respective endpoint 104 for transmission to other endpoints 104. While both video and audio may encounter quality issues, human perception is generally less impacted by video quality, which can sometimes be successfully managed by using still frames, lower-data codec of the video, or omitted entirely. However, if the audio portion suffers from poor quality (e.g., a quality that impedes accurate perception by other users), the conference may require additional time (e.g., "Say that again") to manage the impairment or fail (e.g., "This isn't working. Let's just use email"). It is more common for users to simply miss audio content that is of poor quality and hope the absent content is either superfluous or can be obtained through context or other sources-sometimes successfully, sometimes not.

In one embodiment, the cause of a quality issue is, in whole or in part, resolvable. For example, user 102A is using microphone 106A, which is now many years old. As a result, microphone 106A may insert unwanted sounds, such as saturating the audio signal when speech provided by user 102A comprises certain frequencies. For example, the sound (e.g., encoded audio signals) as observed by the virtual attendee may determine one or more metrics, such as a histogram of audio frequencies encoded in the audio signals. The virtual attendee may determine the metrics for higher-pitched sounds are unusually high. This may result from speech that comprises higher pitched "S" sounds being encoded by an impaired microphone 106A as a hiss or crackle. A virtual attendee, such as a virtual attendee executing as a process on server 112 and/or one or more user endpoints 104, may identify the metrics as an indication of a deficient audio quality and take action to improve or mitigate the audio quality.

Certain quality issues will be unresolvable within the scope of an ongoing conference. For example, purchasing and utilizing a new microphone may resolve the quality issue but would not be an option for the ongoing conference. Other quality issues are, entirely or partially, resolvable. For example, if metrics determined from the audio signal indicate an echo or reverberation, the virtual attendee may filter out the extraneous signal or signal an encoding process to do so. However, if the echo or reverberation is too prominent, the virtual attendee may notify the user providing the speech to relocate to a different location, such as a room with fewer hard services or more sound-absorbing surfaces.

In another embodiment, metrics obtained by the virtual attendee may include metrics of user endpoint 104A, such as the processor load, memory available, packets sent, packets received, model/version number of software and/or hardware, etc. If the virtual attendee determines that the metrics indicate a deficient quality, the metrics may indicate that user endpoint 104A is processor-limited and unable to sufficiently encode or decode the audio and/or video signals. A processor-limited endpoint may be unresolvable within the duration of the current conference (e.g., user endpoint 104A is a very old device) or resolvable, such as when concurrent processes (e.g., performing a processor-intensive background task) exhaust the processing resources. Accordingly, the virtual attendee may cause a processor(s) of user endpoint 104A to suspend or down-prioritize processing of other tasks and/or up-prioritize the encoding/decoding of audio and/or video signals associated with the conference.

In another embodiment, the virtual attendee may obtain metrics for the audio and/or video signals and determine whether or not the quality of the signal(s) is deficient. The virtual attendee may determine, based on human physiology in general or with respect to a particular individual's physiology (e.g., individual users 102), that an audio signal is deficient. For example, a virtual attendee may determine that metrics from the audio signal indicate that more than half of all humans would have comprehension issues if, for example, the audio signals, when decoded and presented as sound (e.g., speech with unwanted attributes) would not be understood by a previously determined threshold of listeners or a particular listener (e.g., one of users 102). If the metrics are determined to not indicate a deficient signal quality, the virtual attendee may take no action and continue monitoring the communication. Additionally or alternatively, the virtual attendee may take actions to make a less-than-ideal audio signal better. For example, the virtual attendant may make minor adjustment to encoding/decoding settings but not signal for any action.

Often a quality issue cannot be improved but it can be managed. The virtual attendee may determine that the encoded audio (or video) signals received from user endpoint 104A are deficient. However, no resolution is possible during the call (e.g., a new microphone needs to be purchased and installed, the processor is outdated and ill-equipped to handle the demands of live conferences and needs replacement, etc.). Accordingly, the virtual attendee may signal the other endpoints (e.g., endpoints 104B-104D) to make an accommodation.

In one embodiment, the accommodation is the presentation of an indicum of the deficient audio, wherein the respective users 102B-102D are then notified that the audio (and/or video) signals received from user 102A cannot be improved and extra attention may be necessary. As a benefit, the participants in the conference can avoid spending time discussing or attempting to resolve the deficient audio signal. Additionally or alternatively, notice may be provided to the user associated with the deficient audio signals (e.g., "Others cannot hear you clearly. Please speak slowly and enunciate.").

In another embodiment, the signal may cause one or more of user endpoints 104B-104D to automatically make an adjustment (e.g., client-side filtering/amplification) or automatically mute, such as to prevent a deficient audio signal comprising speech from user 102A from being further impaired by sounds (e.g., speech, extraneous sounds) originating from one or more of user endpoints 104B-104D. As a further option, automatic muting may be presented, such as on a display device of user endpoint 104B-104D. Unmuting any one or more of user endpoints 104B-104D may be performed manually or after a determined delay. For example, user 102A may be talking continuously, but due to the resulting deficient audio signal received by user endpoints 104B-104D, the decoded speech may include breaks (e.g., signal dropouts). In order to prevent any one of users 102B-102D from speaking, a predetermined delay (e.g., 25 ms) may be initiated and, if the audio signals are void of further speech from user endpoint 104A during the predetermined delay, user endpoints 104B-104D are then unmuted. The current duration of the delay, as it decreases with time and increases with receipt of additional speech, may be presented by user endpoint 104, such as a meter or other graphical element or text (e.g., "mute on," "mute off," etc.). Additionally or alternatively, the deficient audio signals originating from user endpoint 104A may automatically mute microphone 106A, such as when the metrics of the audio signal indicate extraneous noise that is generated (e.g., microphone 106A spontaneously generates clicks, hiss, or static) or observed (e.g., background noise, feedback, etc.).

Embodiments above are primarily directed to audio signals; however, in other embodiments, video quality is of key importance. While recorded video may be delivered more slowly and played back without quality issues, certain live videos may require delivery that is both real-time and of sufficient quality. For example, a trauma team at a hospital may be advising remote personnel how to best treat an ongoing medical emergency. It may be critical that the video accurately depict the patient's condition as the emergency progresses. Accordingly, the virtual attendant collects metrics such as delay, frame loss, frame resolution, etc., for the video signal. If the virtual attendant determines the metrics indicate a deficient video, the virtual attendee may determine if the deficient video is resolvable or not. For example, if the deficient video is due to the limited bandwidth from a satellite link, notice may be provided to the recipient (e.g., "best available video provided") and/or the sender (e.g., "recipients are receiving poor video quality"). The sender, if able, may take steps to ensure the important features are captured, increase the lighting of the scene, etc. The virtual attendant may take actions such as downgrading the audio feed or degrading or pausing signals back to the origin. For example, the user endpoint (e.g., user endpoint 104) may have certain audio (e.g., background noise) and/or video paused or downgraded. As a result, the user endpoint 104 originating from the video may have more processing available, such as to use a codec that requires more computational power but produces a higher-quality video within the limited bandwidth.

In another embodiment, metrics collected by the virtual attendant may determine the audio and/or video signal is deficient and the cause of the deficiency is a network component associated with a source endpoint (e.g., user endpoint 104A). While in certain circumstances, such a deficiency is unresolvable within the scope of the conference as the associated user (e.g., user 102A) cannot obtain and connect a new router or other networking components during the conference. However, user endpoint 104A may be currently utilizing one connection point (e.g., a cellular network) and search for a second connection point (e.g., home Wi-Fi), such as when user endpoint 104A is a cellular-connected device, with more limited bandwidth available, and the associated user was driving but now is within range of their home Wi-Fi signal. The virtual attendant may cause endpoint 104A to be reconfigured to be connected to network 110 via the home Wi-Fi and thereby improve the metrics of the audio and/or video quality.

Figure 2A:
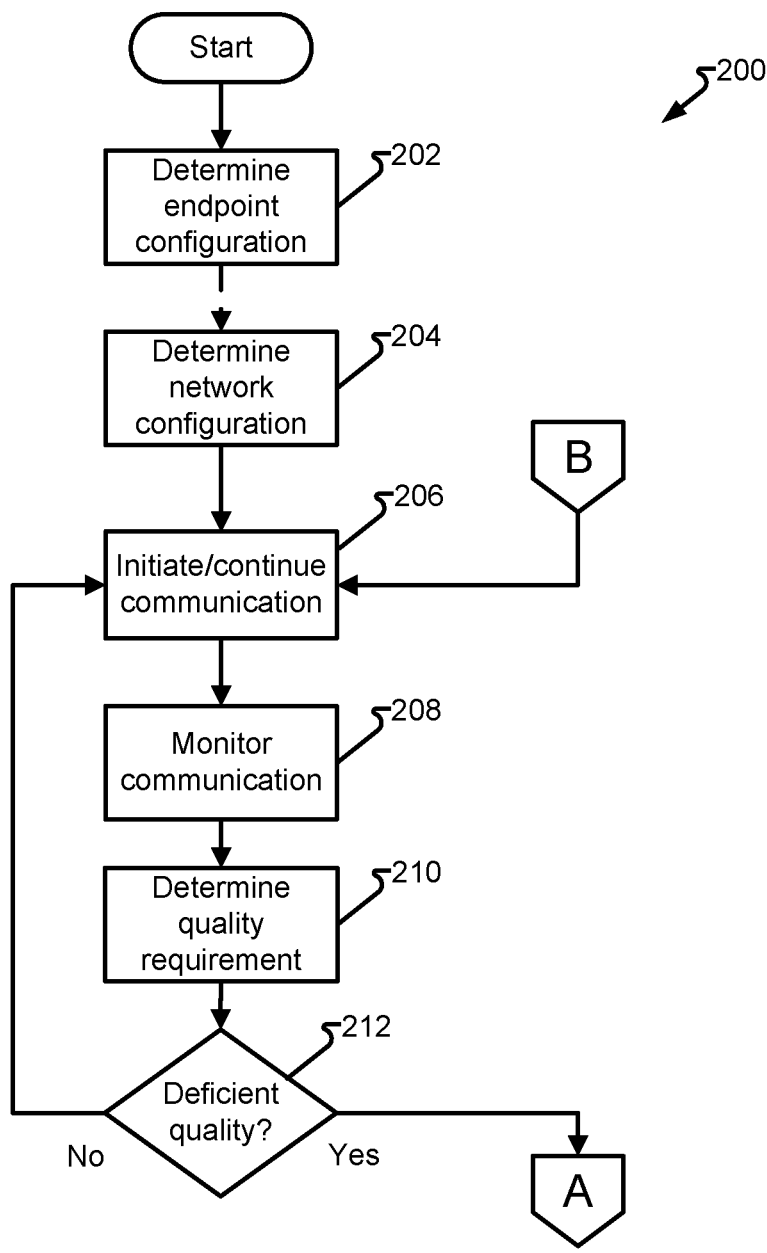
FIGS. 2A-2B depict a process in accordance with embodiments of the present disclosure.
Figure 2B:
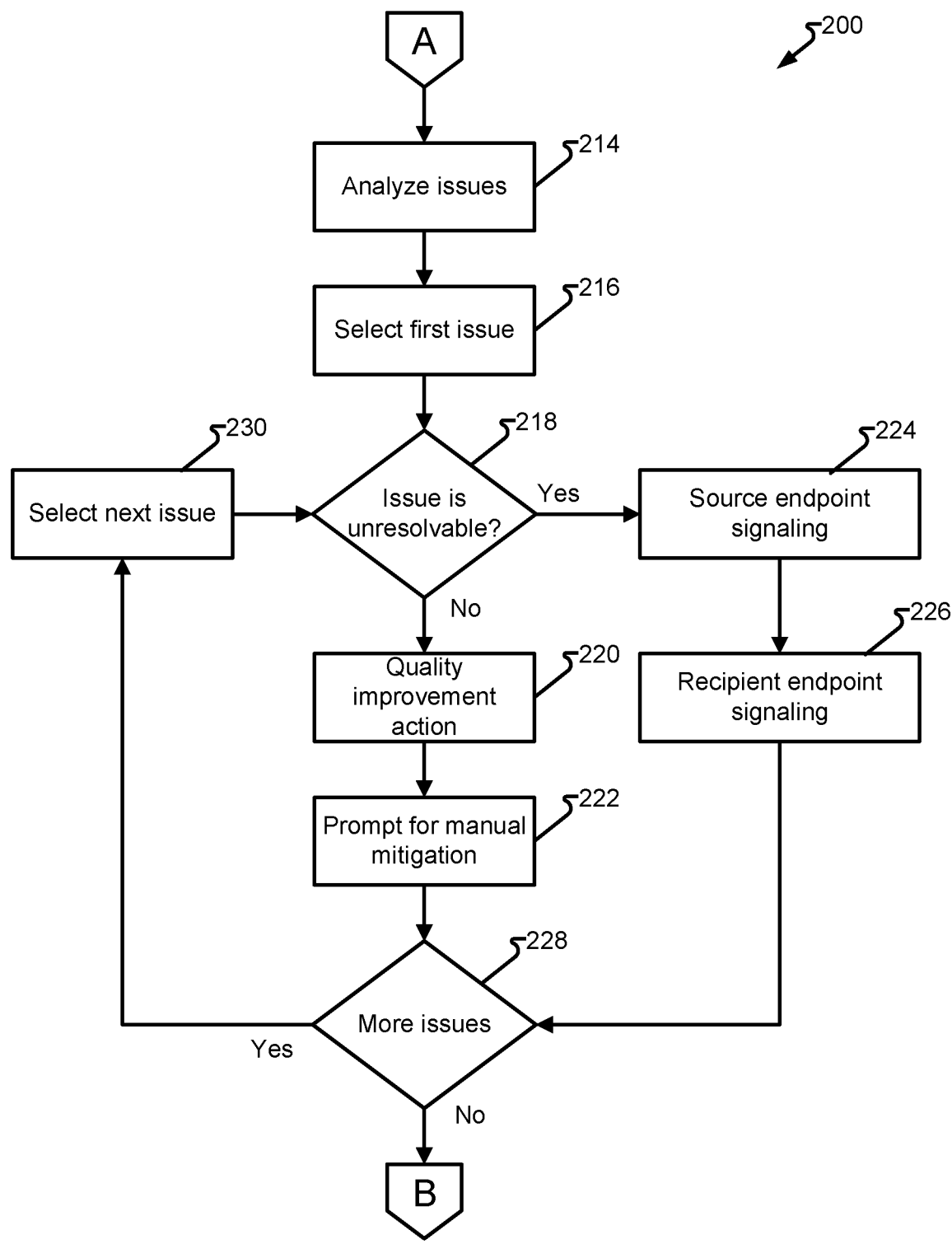

FIGS. 2A-2B depict process 200 in accordance with embodiments of the present disclosure. In one embodiment, process 200 is embodied as machine-readable instructions maintained in a non-transitory memory that when read by a machine, such as a processor of a server, cause the machine to execute the instructions and thereby execute process 200. The processor of the server may include, but is not limited to, at least one processor of server 112 and/or a device comprising at least one processor, such as one or more of user endpoints 104.

Process 200 illustrates a particular order of operation; however, one of ordinary skill will readily recognize that certain steps may be reordered and/or executed in parallel with other steps of process 200. As one example, monitoring step 208 may be performed continually while the communication is ongoing, whereas step 210 may be performed once or upon a content of the communication changing (e.g., the communication begins with voice-only content, but transitions to include video content).

Process 200 begins and, optionally, one or more of step 202 and step 204 are performed. Step 202 determines an endpoint 104's configuration, such as installed hardware, attached peripherals, etc. Step 202 further determines attributes of one or more components of the endpoint, such as manufacturer, product identifier, model number, etc., and the performance characteristics thereof. As a result of step 202, a virtual attendant of a conference may anticipate audio and/or video signal quality issues. For example, if a particular endpoint is configured with a low-resolution camera, an old microphone, an underpowered processor, etc., then metrics gathered during a conference that indicate a deficient audio and/or video signal may be readily associated with the particular configuration of endpoint 104. Conversely, if endpoint 104 is configured with components that are new or sufficiently powerful, the virtual attendant may avoid looking at the particular endpoint as the source of the deficiency and attempt to identify the root cause, and an associated resolution, elsewhere in the connection (e.g., routers, switches, a misconfigured conference server, etc.).

Step 204 may optionally be performed to identify components and/or attributes of a network utilized by a particular endpoint. Step 204 may determine a current or alternative network connection, attributes of routers, switches, etc., maximum available bandwidth, etc. Similar to step 202 above, performing step 204 allows a virtual attendant to know whether one or more network components are the likely source of a deficient audio or video signal or if one or more network components can be eliminated from consideration and other sources and solutions considered.

One or more of steps 202 and 204 may be performed each time a conference is initiated, underway, or terminated, less frequently (e.g., when new hardware or software components are detected, periodically (e.g., every three months, every five conferences), upon a user's request), or omitted.

Step 206 initiates, or continues, a communication comprising two or more endpoints (e.g., user endpoints 104). Step 208 monitors the communication, such as by a virtual attendant executing on server 112 (e.g., a conferencing host that is hosting the communication), one or more endpoints, or a plurality thereof. Step 208 monitors the communication and determines one or more metrics indicating signal quality. In one embodiment, step 208 determines metrics related to the exchange of data between endpoints and/or server (e.g., packet delay, packet loss, etc.). In another embodiment, step 206 determines metrics related to an audio signal, such as microphone defects (e.g., hiss, static, etc.) or unwanted sounds (e.g., echoes, reverberations, background noise, etc.). In another embodiment, step 206 determines metrics related to encoding and/or decoding audio signals (e.g., low fidelity, high fidelity, etc.). In another embodiment, step 206 determines metrics related to a network utilized for the communication (e.g., bandwidth, buffering, etc.). In another embodiment, step 206 determines metrics related to processor load (e.g., utilizing a low-quality audio/video codec due to other processes taxing the processor of endpoint 104, etc.).

Step 210 determines a quality requirement. For example, the current communication may require audio signals from user endpoints to have at least a particular signal-to-noise ratio. If the audio signal falls below the particular signal-to-noise ratio, recipients' ability to comprehend the signal (e.g., speech) will be impaired. Test 212 then determines if the one or more metrics collected in step 208, as compared to a corresponding quality requirement, indicate a deficient signal quality. If test 212 is determined in the negative, then processing loops back to step 206 to continue monitoring the communication. If test 212 is determined in the affirmative, processing continues (via off-page connector "A" to FIG. 2B) to step 214.

Step 214 analyzes one or more quality issues. Step 214 may perform a simple lookup, such as accessing a database, such as may be maintained in data storage 114, with records associating metrics with issues. For example, a record may comprise an entry associating a metric, obtained in step 208, with a defective microphone. Step 214 may perform more complex analysis, such as by providing the metrics to artificial intelligence, such as a neural network, trained to identify the cause of quality issues. As a result, step 214 identifies one or more issues wherein the metrics of the audio and/or video signals indicate a deficient quality thereof.

In response, process 216 selects the first issues and determines, in test 218, if the issue is associated with an unresolvable issue. Test 218 may perform a simple lookup, such as of a database comprising records associating issues with unresolvable (within the scope of the ongoing communication) issues. For example, test 218 may access a database, such as may be maintained in data storage 114, comprising a record with an entry associating a defective microphone as an unresolvable issue, again unresolvable within the scope of the ongoing communication. In another embodiment, test 218 may provide the issue and/or an attribute thereof (e.g., one or more metrics) to a neural network trained to determine whether or not an issue is resolvable and receive a response therefrom. If test 218 is determined in the affirmative (the issue is unresolvable), processing continues to step 224. If test 218 is determined in the negative (i.e., the issue is, in whole or in part, resolvable) processing continues to step 220.

Step 224 signals the source endpoint (i.e., the origin of the audio signals and/or video signals having the unresolved issue) of the unresolvable issue. For example, step 224 may comprise a signal that triggers a notification (e.g., an alert providing the message, "The recipients cannot hear you well. Speak slowly and enunciate."). Step 226 signals one or more recipient endpoints. For example, step 226 may comprise a signal causing a recipient endpoint to perform an accommodation action. The accommodation action may be a notification to accept the deficiency for the duration of the communication (e.g., "Bob's microphone is known to be defective," "The quality of audio cannot be improved at this time."). Additionally or alternatively, the accommodation action may be to automatically cause the volume to increase or adjust the tone on a receiving endpoint when a user associated with the unresolvable issue (e.g., a deficient audio signal) is speaking. The audio signal is not improved but the effect of the deficiency is, at least partially, mitigated.

Processing then continues to test 228 to determine if there are more issues. If test 228 is determined in the negative, processing loops (via off-page connector "B" to FIG. 2A) back to step 206. If test 228 is determined in the affirmative, processing continues to step 230, which selects the next issue and loops back to test 218.

When test 218 is determined in the negative, processing continues to step 220. Step 220 selects and performs a quality improvement action. Selecting a particular action or actions may comprise the virtual attendee performing a lookup. For example, a database, such as may be maintained in data storage 114, may contain records of resolvable issues and corresponding resolutions. In another embodiment, the virtual attendee may provide one or more of the monitored communication, one or more metrics, endpoint configuration, network configuration, or a combination thereof to a neural network trained to determine a quality improvement action therefrom. Step 220 then implements the action, such as by the virtual attendee performing the action itself or signaling a component (e.g., an endpoint, a sever, a network device, etc.) to perform the quality improvement action.

Step 220 may be entirely autonomous (i.e., performed by one or more endpoints, data storage, and/or a server); however, certain quality improvement actions may, at least in part, require prompting for manual intervention by one or more users of endpoints 104. For example, endpoint 104 may be located in a room with hard surfaces that is causing reverberations to be picked up by the microphone. Step 220 may initiate or modify acoustic filtering on the respective endpoint and/or server, which may reduce the reverberations but not eliminate them. As a result, step 222 may prompt the user for manual mitigation, such as relocating to an area with more acoustic-absorbing features. Processing then continues to test 228.

As described above, one or more steps of process 200 may be reordered, performed continually, and/or performed in parallel with other processes other than the order depicted in FIGS. 2A-2B. Process 200 may continue to execute for the duration of the communication and terminate at any step or test when the communication ends.

Figure 3:
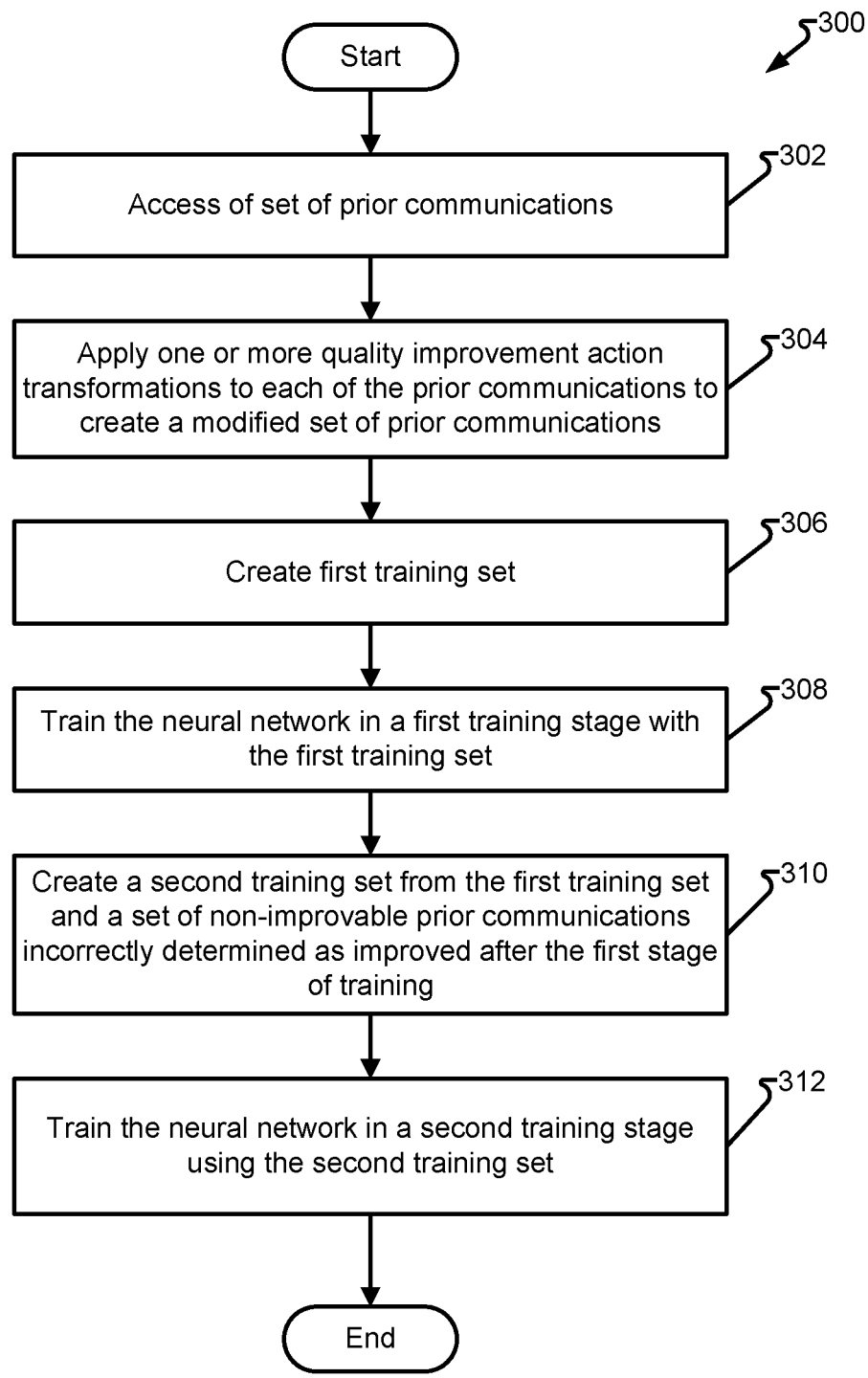
FIG. 3 depicts a process in accordance with embodiments of the present disclosure.

FIG. 3 depicts process 300 in accordance with embodiments of the present disclosure. In one embodiment, process 300 is embodied as machine-readable instructions maintained in a non-transitory memory that when read by a machine, such as a processor of a server, cause the machine to execute the instructions and thereby execute process 300. The processor of the server may include, but is not limited to, at least one processor of server 112 and/or a device comprising at least one processor, such as one or more of user endpoints 104.

Process 300 trains a neural network to identify a quality improve action to improve the quality of a communication. The neural network is provided with the communication, metrics of the communication, endpoint configuration, host server configurations, or a combination of any two or more of the foregoing, to select a quality improvement action. Neural networks are known in the art to self-configure layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Step 302 accesses a set of prior communications, such as from a database or other data repository. The set of prior communications may comprise quality deficient communications, quality non-deficient communications, or a combination thereof. The communications are real-time communications comprising encoded audio signals (e.g., digitized speech), encoded video signals (e.g., digitized frames of captured images), or both. Optionally, the communications may comprise additional encoded signals (e.g., still images, text messages, files, etc.). Step 304 applies one or more quality improvement action transformations to each of the prior communications to create a modified set of prior communications. The quality improvement transformations include one or more of simulating an impaired microphone (e.g., inserting crackle, hiss, pops, or static; lowering fidelity; lowering frequency response, etc.), simulating an improved microphone (e.g., removing crackle, hiss, pops, or static; raising fidelity; broadening frequency response, etc.), simulating an impaired camera (e.g., decreasing framerate, reducing frame size, lowering color sensitivity, inserting signal noise, etc.), simulating an improved camera (e.g., increasing framerate, increasing frame size, increasing color sensitivity, removing signal noise, etc.), simulating an impaired processor of an endpoint (e.g., decreasing operations per second, reducing on-chip memory capacity, reducing the number of concurrent processes, adding additional concurrent processes, etc.), simulating an improved processor of an endpoint (e.g., increasing operations per second, increasing on-chip memory capacity, increasing the number of concurrent processes, removing concurrent processes, etc.), simulating an impaired network component (e.g., decreasing available bandwidth, increasing the rate of dropped packets, delaying packets, etc.), simulating an improved network component (e.g., increasing available bandwidth, decreasing the rate of dropped packets, timely delivering of packets, etc.), simulating an impaired processor of a server (e.g., increasing concurrent processing load, decreasing processing capacity, increasing read/write operations to external components, etc.), simulating an improved processor (e.g., decreasing concurrent processing load, increasing processing capacity, decreasing read/write operations to external components, etc.).

Step 306 then creates a first training set comprising the collected set of prior communications, the modified set of prior communications, and a set of non-improved prior communications. The non-improved prior communications may comprise communications that are not quality deficient, communications that are quality deficient but unaffected by a particular quality improvement action (e.g., a communication impaired by low-bandwidth is not improved by filtering out a reverberation), a communication having a quality deficiency that is worsened by the quality improvement (e.g., altering a setting that exacerbates the deficiency), or a combination of any two or more of the foregoing. Step 308 then trains the neural network in a first training stage using the first training set.

Step 310 creates a second training set for a second stage of training comprising the first training set and the set of prior non-improved prior communications incorrectly determined as improved after the first stage of training. Step 312 trains the neural network in the second training stage using the second training set.

Figure 4:
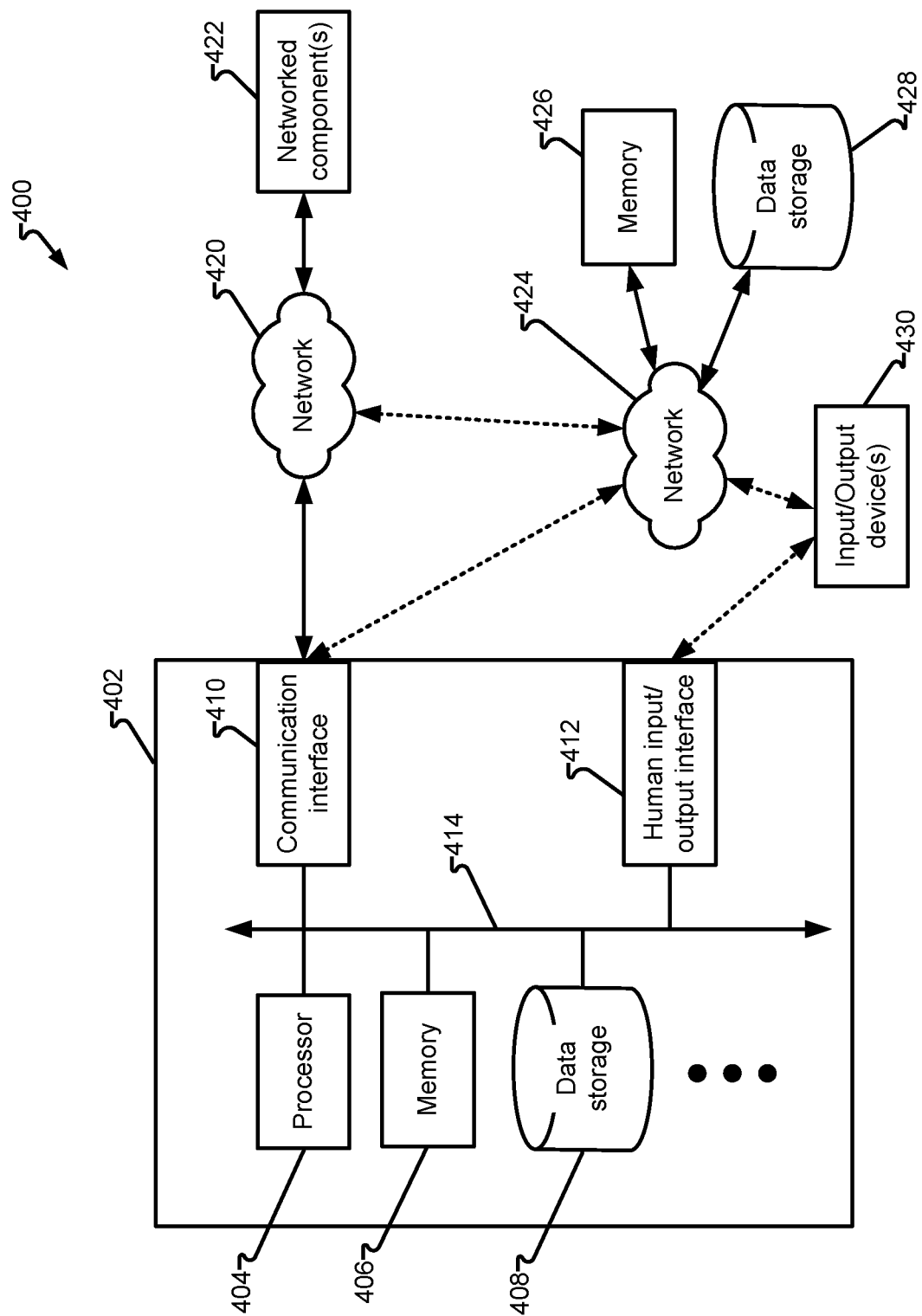
FIG. 4 depicts a system in accordance with embodiments of the present disclosure.

FIG. 4 depicts device 402 in system 400 in accordance with embodiments of the present disclosure. In one embodiment, user endpoint 104 and/or server 112 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may comprise programmable logic functionality, such as determined, at least in part, from machine-readable instructions maintained in a coupled computer-readable medium maintained in a non-transitory data storage, which may be embodied as circuitry, on-chip read-only memory, computer memory 406, data storage 408, etc., that cause the processor 404 to perform the steps of the instructions. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize computer memory 406 and/or data storage 408 for the storage of accessible data, such as instructions, values, etc. Communication interface 410 facilitates communication with components, such as processor 404 via bus 414 with components not accessible via bus 414 and may be embodied as a network interface (e.g., ethernet card, wireless networking components, USB port, etc.). Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or configured to utilize one or more networks, such as network 420 and/or network 424.

Network 110 may be embodied, in whole or in part, as network 420. Network 420 may be a wired network (e.g., Ethernet), wireless (e.g., WiFi, Bluetooth, cellular, etc.)

network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.).

Additionally or alternatively, one or more other networks may be utilized. For example, network 424 may represent a second network, which may facilitate communication with components utilized by device 402. For example, network 424 may be an internal network to a business entity or other organization whereby components are trusted (or at least more so) than networked components 422, which may be connected to network 420 comprising a public network (e.g., Internet) that may not be as trusted.

Components attached to network 424 may include computer memory 426, data storage 428, input/output device(s) 430, and/or other components that may be accessible to processor 404. For example, computer memory 426 and/or data storage 428 may supplement or supplant computer memory 406 and/or data storage 408 entirely or for a particular task or purpose. As another example, computer memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of computer memory 406, data storage 408, computer memory 426, data storage 428 comprise a non-transitory data storage comprising a data storage device.

It should be appreciated that computer-readable data may be sent, received, stored, processed, and presented by a variety of components. It should also be appreciated that components illustrated may control other components, whether illustrated herein or otherwise. For example, one input/output device 430 may be a router, a switch, a port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A conferencing component, comprising:
a processor coupled to a computer-readable medium comprising processor-executable instructions that, when executed, cause the processor to:
monitor a communication between a plurality of endpoints via a network, the communication comprising at least one of encoded audio or encoded video originating from at least one endpoint of the plurality of endpoints;
determine, from the monitored communication, one or more metrics indicating a signal quality of at least one of the encoded audio or the encoded video;
when the one or more metrics indicates a deficient signal quality, further determine whether the one or more metrics is associated with an unresolvable signal quality;
upon determining that the one or more metrics is associated with the unresolvable signal quality, signal at least one endpoint of the plurality of endpoints to perform an accommodation action;
upon determining that the one or more metrics is not associated with the unresolvable signal quality, initiate a quality improvement action;
upon determining that the one or more metrics indicate the deficient signal quality, when the one or more metrics indicate a cause of the deficient signal quality comprises a first connection to the network utilized by one endpoint of the plurality of endpoints, search for a second connection to the network; and
upon locating the second connection, reconfigure the one endpoint of the plurality of endpoints to utilize the second connection to the network and terminate use of the first connection to the network.

2. The conferencing component of claim 1, wherein the quality improvement action comprises automatically muting at least one endpoint of the plurality of endpoints.

3. The conferencing component of claim 1, wherein the quality improvement action comprises activating an alerting function of at least one endpoint of the plurality of endpoints originating from the at least one of the encoded audio or the encoded video.

4. The conferencing component of claim 1, wherein the processor-executable instructions to cause the processor to signal at least one of the plurality of endpoints to perform the accommodation action further comprise instructions to cause the processor to signal at least one of the plurality of endpoints to present an indicum of the deficient signal quality.

5. The conferencing component of claim 1, wherein the processor-executable instructions to cause the processor to signal the at least one of the plurality of endpoints to perform the accommodation action further comprise instructions to cause the processor to signal the at least one of the plurality of endpoints to automatically mute an audio input providing the encoded audio.

6. The conferencing component of claim 1, further comprising: instructions to cause the processor to
  determine a muting duration associated with a time that additional audio signals will not further degrade the signal quality of at least one of the encoded audio or the encoded video;
  when the encoded audio comprises audio originating from one endpoint of the plurality of endpoints, automatically muting a second endpoint of the plurality of endpoints; and
  when the encoded audio is void of the audio originating from the one endpoint of the plurality of endpoints for the muting duration, automatically unmuting the second endpoint of the plurality of endpoints.

7. The conferencing component of claim 1, wherein the processor-executable instructions to cause the processor to signal the at least one of the plurality of endpoints to perform the accommodation action further comprise instructions to cause the processor to signal the at least one of the plurality of endpoints to activate a notification feature indicating a non-improvability.

8. The conferencing component of claim 1, further comprising instructions to cause the processor to determine that at least one of the conferencing component or a component of the network is associated with an attribute that corresponds to the one or more metrics that indicate the deficient signal quality.

9. The conferencing component of claim 1, wherein the processor-executable instructions to cause the processor to determine the one or more metrics indicating the signal quality further comprise instructions to cause the processor to provide the monitored communication to a neural network trained to receive the monitored communication and, therefrom, determine the quality improvement action.

10. The conferencing component of claim 9, wherein training of the neural network to determine the quality improvement action comprises:
  collecting a set of prior communications from a database, the prior communications comprising deficient quality communications and non-deficient quality communications;
  applying one or more quality improvement action transformations to each prior communication, including simulating an impaired microphone, simulating an improved microphone, simulating an impaired camera, simulating an improved camera, simulating an impaired processor of an endpoint, simulating an improved processor of an endpoint, simulating an impaired network component, simulating an improved network component, simulating an impaired processor of a server, and simulating an improved processor of a server, to create a modified set of prior communications;
  creating a first training set comprising the collected set of prior communications, the modified set of prior communications, and a set of non-improved prior communications; training the neural network in a first stage using the first training set;
  creating a second training set for a second stage of training comprising the first training set and the set of prior non-improved prior communications incorrectly determined as improved after the first stage of training; and
  training the neural network in the second stage using the second training set.

11. The conferencing component of claim 1, wherein the conferencing component comprises one endpoint of the plurality of endpoints.

12. The conferencing component of claim 1, wherein the conferencing component comprises a server hosting the communication.

13. A method for improving quality of a communication, comprising:
  monitoring the communication between a plurality of endpoints via a network, the communication comprising at least one of encoded audio or encoded video originating from at least one endpoint of the plurality of endpoints;
  determining, from the monitored communication, one or more metrics indicating a signal quality of at least one of the encoded audio or the encoded video;
  when the one or more metrics indicates a deficient signal quality, further determining whether the one or more metrics is associated with an unresolvable signal quality;
  upon determining that the one or more metrics is associated with the unresolvable signal quality, signaling at least one of the plurality of endpoints to perform an accommodation action; and
  upon determining that the one or more metrics is not associated with the unresolvable signal quality, initiating a quality improvement action;
  upon determining that the one or more metrics indicate the deficient signal quality, when the one or more metrics indicate a cause of the deficient signal quality comprises a first connection to the network utilized by one endpoint of the plurality of endpoints, searching for a second connection to the network; and
  upon locating the second connection, reconfiguring the one endpoint of the plurality of endpoints to utilize the second connection to the network and terminate use of the first connection to the network.

14. The method of claim 13, wherein the quality improvement action comprises automatically muting at least one endpoint of the plurality of endpoints.

15. The method of claim 13, wherein the quality improvement action comprises activating an alerting function of one endpoint of the plurality of endpoints originating from the at least one of the encoded audio or the encoded video.

16. The method of claim 13, wherein signaling the at least one of the plurality of endpoints to perform the accommodation action further comprises signaling the at least one of the plurality of endpoints to present an indicum of the deficient signal quality.

17. The method of claim 13, wherein signaling the at least one of the plurality of endpoints to perform the accommodation action further comprises signaling the at least one of the plurality of endpoints to automatically mute an audio input providing the encoded audio.

18. A computer-readable medium coupled to a processor, the computer-readable medium comprising one or more computer-readable instructions, the processor executing the one or more computer-readable instructions to:
  monitor a communication between a plurality of endpoints via a network, the communication comprising at least one of encoded audio or encoded video originating from at least one endpoint of the plurality of endpoints;

determine, from the monitored communication, one or more metrics indicating a signal quality of at least one of the encoded audio or the encoded video;

when the one or more metrics indicates a deficient signal quality, further determine whether the one or more metrics is associated with an unresolvable signal quality;

upon determining that the one or more metrics is associated with the unresolvable signal quality, signal at least one of the plurality of endpoints to perform an accommodation action; and upon determining that the one or more metrics is not associated with the unresolvable signal quality, initiate a quality improvement action;

upon determining that the one or more metrics indicate the deficient signal quality, when the one or more metrics indicate a cause of the deficient signal quality comprises a first connection to the network utilized by one endpoint of the plurality of endpoints, searching for a second connection to the network; and upon locating the second connection, reconfiguring the one endpoint of the plurality of endpoints to utilize the second connection to the network and terminate use of the first connection to the network.

19. The computer-readable medium of claim 18, wherein the quality improvement action comprises automatically muting at least one endpoint of the plurality of endpoints.

20. The computer-readable medium of claim 18, wherein the quality improvement action comprises activating an alerting function of one endpoint of the plurality of endpoints originating from the at least one of the encoded audio or the encoded video.

* * * * *